(12) United States Patent
Fellinger et al.

(10) Patent No.: US 9,978,325 B2
(45) Date of Patent: May 22, 2018

(54) CONTROL UNIT FOR A SEGMENT LIQUID CRYSTAL DISPLAY AND A METHOD THEREOF

(71) Applicants: Viktor Fellinger, Buedingen (DE); Stefan Singer, Vaterstetten (DE)

(72) Inventors: Viktor Fellinger, Buedingen (DE); Stefan Singer, Vaterstetten (DE)

(73) Assignee: NXP USA, INC., Austin, TX (US)

( * ) Notice: Subject to any disclaimer, the term of this patent is extended or adjusted under 35 U.S.C. 154(b) by 223 days.

(21) Appl. No.: 15/027,702

(22) PCT Filed: Oct. 21, 2013

(86) PCT No.: PCT/IB2013/059505
§ 371 (c)(1),
(2) Date: Apr. 7, 2016

(87) PCT Pub. No.: WO2015/059513
PCT Pub. Date: Apr. 30, 2015

(65) Prior Publication Data
US 2016/0253974 A1 Sep. 1, 2016

(51) Int. Cl.
*G09G 3/36* (2006.01)
*G09G 3/32* (2016.01)
(Continued)

(52) U.S. Cl.
CPC ....... *G09G 3/3622* (2013.01); *G02F 1/13306* (2013.01); *G02F 1/134327* (2013.01);
(Continued)

(58) Field of Classification Search
CPC .. G09G 3/3629–3/3644; G09G 3/3681; G09G 3/3692; G09G 3/3696
See application file for complete search history.

(56) References Cited

U.S. PATENT DOCUMENTS

| 5,414,342 A | 5/1995 | Mammano et al. |
|---|---|---|
| 5,627,558 A | 5/1997 | Hotto |

(Continued)

FOREIGN PATENT DOCUMENTS

| WO | 2008124051 A1 | 10/2008 |
|---|---|---|
| WO | 2008133885 A1 | 11/2008 |

OTHER PUBLICATIONS

International Search Report for the International application No. PCT/IB2013/059505 dated Jun. 27, 2014.
(Continued)

*Primary Examiner* — Patrick F Marinelli (57) ABSTRACT

A unit (10; 11; 12; 13) used to control a segment liquid crystal display (15; 16). The segment liquid crystal display (15; 16) includes at least a backplane electrode (20) and at least a front plane electrode (25) both associated with a same segment of the segment liquid crystal display (15; 16). The unit (10; 11; 12; 13) includes a controller (30; 40; 50) in order to generate a pulse-width-modulated control signal (35) that has two voltage levels and a variable duty cycle. The unit (10; 1; 12; 13) further includes an integrator (60; 61) to integrate the pulse-width-modulated control signal (35) and to provide an integrated control signal (90) which has more than two discrete voltage levels corresponding to different variable duty cycle values. An output of the unit (10; 11; 2; 13) supplies the integrated control signal (90) to the at least a backplane electrode (20) or to the at least a front plane electrode (25) so that visibility of the same segment in the segment liquid crystal display (15; 16) can be controlled. By having a pulse-width-modulated control signal (35) with only two voltage levels and different duty cycle values generated by the controller (30; 40; 50), and by having the integrator (60; 61) integrating said pulse-width-modulated control signal (35), more than two different discrete voltage levels are generated to control the at least a backplane
(Continued)

electrode (20) or at least a front plane electrode (25) without the need to use an application specific segment liquid crystal interface in the unit (10; 11; 12; 13), thereby abating the cost of implementation of the unit (10; 11; 12; 13).

19 Claims, 5 Drawing Sheets

(51) Int. Cl.
    *G02F 1/133* (2006.01)
    *G02F 1/1343* (2006.01)
    *G09G 3/04* (2006.01)
    *G09G 3/20* (2006.01)

(52) U.S. Cl.
    CPC ............ *G09G 3/04* (2013.01); *G09G 3/2014* (2013.01); *G09G 3/2025* (2013.01); *G09G 3/3629* (2013.01); *G09G 2310/0243* (2013.01); *G09G 2310/06* (2013.01); *G09G 2320/0242* (2013.01); *G09G 2320/066* (2013.01); *G09G 2330/028* (2013.01)

(56) References Cited

U.S. PATENT DOCUMENTS

| | | | |
|---|---|---|---|
| 5,684,503 A * | 11/1997 | Nomura | G09G 3/3629 345/94 |
| 6,295,042 B1 * | 9/2001 | Aoki | G09G 3/3611 345/100 |
| 7,907,110 B2 | 3/2011 | Vergnes | |
| 8,102,401 B2 | 1/2012 | Vergnes | |
| 8,704,818 B2 * | 4/2014 | Van Ess | G09G 3/3611 345/212 |
| 8,773,420 B2 * | 7/2014 | Van Ess | G09G 3/3611 345/212 |
| 9,852,702 B2 * | 12/2017 | Van Ess | G09G 3/3611 |
| 2008/0136340 A1 | 6/2008 | Lee | |
| 2008/0246746 A1 | 10/2008 | Vergnes | |
| 2008/0266301 A1 | 10/2008 | Vergnes | |
| 2011/0169814 A1 * | 7/2011 | Van Ess | G09G 3/3611 345/212 |
| 2012/0074860 A1 | 3/2012 | Lee | |
| 2012/0162293 A1 | 6/2012 | Hudson et al. | |
| 2013/0141416 A1 * | 6/2013 | Van Ess | G09G 3/3611 345/212 |
| 2014/0267216 A1 * | 9/2014 | Van Ess | G09G 3/3611 345/212 |
| 2016/0253974 A1 * | 9/2016 | Fellinger | G02F 1/13306 345/208 |
| 2017/0330509 A1 * | 11/2017 | Cok | G09G 3/3225 |

OTHER PUBLICATIONS

Malik, Daniel, "X-gate Library: TN/STN LCD Driver, Driving Bare TN and STN LCDs Using GPIO Pins", Freescale Semiconductor Application Note, AN3219, Rev., Feb. 2006.

\* cited by examiner

CONTROL UNIT FOR A SEGMENT LIQUID CRYSTAL DISPLAY AND A METHOD THEREOF

FIELD OF THE INVENTION

This invention relates to a unit that controls a segment liquid crystal display and to a method of controlling a segment liquid crystal display. The invention further relates to a segment liquid crystal display device, or to a heating ventilation unit or air conditioning unit for an automotive vehicle wherein any of the device or units include said segment liquid crystal display and said unit.

BACKGROUND OF THE INVENTION

Segment liquid crystal displays (LCD) are displays typically used in a large variety of applications, e.g. in heating ventilation and/or air conditioning units in a car to show for example temperature, levels of ventilation and/or conditioning, etc. to show application specific symbols on the segments of the segment liquid crystal display. Segment liquid crystal displays may also be used for example in cluster instrument units or in many other electronic devices such as watches, displays in cameras, etc.

The most common segment LCD is typically the twisted nematic display. The twisted nematic display consists of a nematic liquid crystal sandwiched between two glass plates. Inner surfaces of the glass plates are coated with a transparent metal oxide film, which acts as an electrode, and are used to apply voltages to control visibility of a segment in the segment LCD. Polymer alignment layers are placed on top of the electrodes, and polarizers are applied to a top and bottom surface of the nematic liquid crystal display. In twisted nematic display the polarizers and the polymer alignment layers are oriented perpendicular to each other. One front plane electrode and one backplane electrode are typically associated with a segment of the segment LCD to control the visibility of the segment. Static driven segment LCDs have only one backplane electrode and one front plane electrode associated with each segment that the segment LCD can display. A front plane electrode or a backplane electrode may be associated to multiple segments of the segment LCD in which case the segment LCD is a dynamically driven segment LCD. For segment liquid crystal displays with a large number of segments the dynamically driven segment LCD allows to reduce a number of electrodes controlling the segment LCD compared to the static driven segment LCDs. Dynamically driven segment LCDs may have typically at least two backplane electrodes and a plurality of front plane electrodes organized in a matrix.

The voltage applied to the front plane and backplane electrodes of the segment LCD should have no DC components. If a DC component exists, any impurity ions present will migrate towards the front plane or back plane electrodes, causing an electric field to persist also in absence of an applied voltage so that the segment in the segment LCD may be not made visible or invisible anymore. Therefore the voltages applied to the front plane and backplane electrodes are typically AC voltages arranged such that at least over a predetermined number of cycles no DC components may be present.

While static driven segment LCDs may be driven with AC voltages with only two discrete voltage levels because only one backplane electrode and one of the front plane electrodes are associated with the same segment, dynamically driven segment LCDs must be controlled with AC voltages with more than two discrete voltage levels. In fact the visibility of a segment in dynamically driven segment LCDs depends not only on a first differential voltage between the AC voltages applied to the front plane and backplane electrodes associated with said segment but also on a second differential voltage between the voltage applied to the front plane electrode associated with said segment and the voltage applied to another backplane electrode not associated with said segment. In order to make said segment visible, the first differential voltage may be kept for example above a first predetermined threshold while the second differential voltage may be kept below a second predetermined threshold.

Furthermore, when segment LCDs are viewed at an angle away from their optical axis, a contrast of the visible segment versus an invisible segment decreases, especially in dynamically driven segment LCDs with a large number of backplane electrodes. The contrast of the visible segment versus the invisible segment in the segment LCDs may be improved by the use of more than two discrete voltage levels in the AC voltages controlling the front plane and backplane electrodes of the segment LCDs.

Segment LCDs are typically controlled by microcontrollers with an application specific interface to drive multiple backplane and front plane electrodes with AC voltages having multiple discrete voltage levels. For abating costs, segment LCDs may be typically controlled also by general purpose microcontrollers without the application specific interface. The application specific interface may in fact increase chip area if integrated on chip with the microcontroller or may increase component count if implemented off-chip. However one of the limitations of general purpose microcontrollers is that only two output discrete voltage levels are available to control the segment LCD: normally a supply voltage and a reference voltage (i.e. typically a ground voltage) of the general purpose microcontroller.

Application note AN3219 from Freescale "Xgate Library: TN/STN LCD driver" discloses a configuration of a general purpose microcontroller controlling a segment LCD with three discrete voltage levels which drive corresponding backplane electrodes. The third discrete voltage level is derived externally to the general purpose microcontroller by means of the supply voltage of the general purpose microcontroller connected to a resistor ladder. When the third discrete voltage level is needed, the two output discrete voltage levels of the general purpose microcontroller are disabled and corresponding outputs of the general purpose microcontroller at which the first two voltages are generated, are configured as inputs showing high impedance to the resistor ladder. When the third discrete voltage level is not needed, the corresponding outputs of the general purpose microcontroller override the resistor ladders and the general purpose microcontroller applies the two output discrete voltages levels (i.e. as said the supply voltage and the reference voltage of the general purpose microcontroller) to the corresponding backplane electrodes.

One problem associated with the solution proposed in the above mentioned Freescale application note is that said solution lacks of flexibility because no more than three discrete voltage levels can be produced. The contrast improvement between visible and invisible segments is thus limited. Furthermore use of the general purpose microcontroller is thus limited to applications with a limited number of backplane electrodes. It is in fact well known and also described in the above mentioned application note, that for applications with a high number of backplane electrodes, even an higher number of discrete voltage levels is needed in order to optimize the contrast between visible and invisible segments in segment LCDs.

SUMMARY OF THE INVENTION

The present invention provides a unit that controls a segment liquid crystal display as claimed in claim 1. The present invention further provides a segment liquid crystal display device including the unit and the segment liquid crystal display, a heating ventilation unit or air conditioning unit communication processor including the segment liquid crystal display device, or the unit and the segment liquid crystal display. The present invention further provides an integrated circuit which includes a controller of the unit, or said liquid crystal display device. The present invention further provides a method of controlling a segment liquid crystal display, a unit to perform the method and a computer program product including instructions to cause the unit to perform said method.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
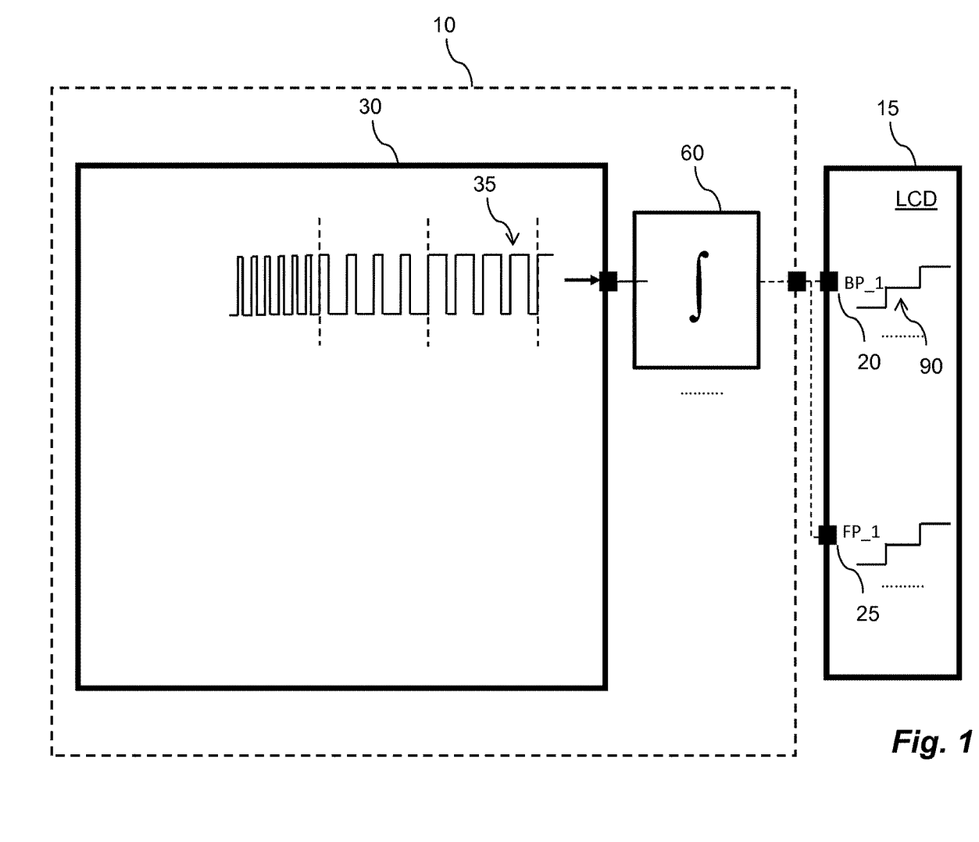
FIG. 1 schematically shows an example of an embodiment of a unit used to control a segment liquid crystal display, FIG. 2 schematically shows a further example of an embodiment of a unit used to control a segment liquid crystal display, FIG. 3 schematically shows another example of an embodiment of a unit used to control a segment liquid crystal display, FIG. 4 schematically shows a further example of an embodiment of a unit used to control segment liquid crystal display, and FIG. 5 schematically shows a flow chart of a method of controlling a segment liquid crystal display.

FIG. 1 shows a unit 10 (further also referred to as the control unit 10) used to control a segment liquid display 15. The segment liquid crystal display 15 may be a twisted nematic display as described in the background of the invention and may be used in a large variety of applications such as in heating ventilation and/or air conditioning units in a car to show for example temperature, levels of ventilation and/or conditioning. The applications in which the segment liquid crystal display 15 may be used may also include for example cluster instrument units to show application specific symbols on the segment liquid crystal display 15, or many other electronic devices such as watches, cameras, etc. The segment liquid crystal display 15 includes at least a backplane electrode 20 and at least a front plane electrode 25, schematically shown in FIG. 1 with black square terminals. The backplane electrode 20 and the front plane electrode 25 are both associated with a same segment of the segment liquid crystal display 15 and are used to control the visibility of said segment in the segment liquid crystal display 15. If the segment liquid crystal display 15 has more than one segment, the backplane electrode 20 may be associated with other segments than the one segment to which the front plane electrode 25 is also associated.

The control unit 10 includes a controller 30 that generates a pulse-width-modulated control signal 35. The controller 30 may be a general purpose microcontroller as explained in the background of invention. The pulse-width-modulated control signal 35 has two voltage levels and a variable duty cycle. The two voltage levels of the pulse-width-modulated signal 35 may be respectively a supply voltage and a reference voltage (e.g. a ground reference voltage of 0 V) of the controller 30. The pulse-width-modulated control signal 35 may be a signal with a variable frequency wherein the variable frequency is determined by the variable duty cycle. The variable duty cycle may have any value between 0 to 100%. In the example shown in FIG. 1 the pulse-width-modulated control signal 35 is a square wave signal with variable frequency. The control unit 10 further includes an integrator 60 that integrates the pulse-width-modulated control signal 35 to obtain an integrated control signal 90. The integrated control signal 90 in this way obtained has more than two discrete voltage levels correspondent to different values of the variable duty cycle. The integrated control signal 90 is supplied to the at least backplane electrode 20 or to the at least front plane electrode 25 through an output of the control unit 10 to control the visibility of the same segment to which the backplane electrode 20 and the front plane electrode 25 are both associated. Any one of the at least backplane electrode 20 or the at least front plane electrode 25 not coupled to the integrator 60, may be for example coupled to the supply voltage or the reference voltage of the controller 30.

In one embodiment, as will be explained later with reference to FIG. 3, the control unit 10 may include a further integrator different from said integrator 60 and the controller 30 may be configured to generate a further pulse-width-modulated control signal which is integrated by the further integrator to generate a further integrated control signal. The further integrated control signal may be coupled to any ones of the at least a backplane electrode 20 or to the at least a front plane electrode 25 which do not receive the first mentioned integrated control signal 90.

The integrator 60 may integrate more than two different values of the variable duty cycle of the pulse-width-modulated control signal 35 in order to obtain more than two discrete voltage levels in the integrated control signal 90. The integrator 60 may be implemented in any way suitable for the application in order to obtain an average voltage level from a correspondent duty cycle value or from a plurality of different duty cycle values in the pulse-width-modulated control signal 35. In other words the integrator 60 may integrate over a time span of the pulse-width-modulated control signal 35 with a predetermined duty cycle value in order to obtain an average voltage level dependent on the predetermined duty cycle value and on the two voltage levels of the pulse-width-modulated control signal 35. Alternatively a single average voltage level may be obtained by integration of the integrator 60 over a time span of pulse-width-modulated control signal 35 with a plurality of different predetermined duty cycle values. Each discrete voltage level of the integrated control signal 90 may be obtained with integration of the pulse-width-modulated control signal 35 over a predetermined time span of the pulse-width-modulated control signal 35. As mentioned in the background of the invention, a controller, which may be a general purpose microcontroller used in multiple applications, has typically two discrete output voltage levels, typically one corresponding to the supply voltage and the other one corresponding to the reference voltage of the controller 30. As a consequence the controller 30 is well suited to generate the pulse-width-modulated signal 35 with only two voltage levels without extra expensive components By having a pulse-width-modulated control signal 35 with only two voltage levels and different duty cycle values generated by the controller 30, and by having the integrator 60 integrating said pulse-width-modulated control signal 35, more than two different discrete voltage levels are generated to control the at least a backplane electrode 20 or at least a front plane electrode 25 without the need to use an application specific segment liquid crystal interface in the control unit 10, thereby abating the cost of implementation of the control unit 10. The prior art separate application specific segment liquid crystal interface is commonly used in standard control units to generate multiple voltage levels to control the visibility of the segments in the segment liquid crystal display 15. Furthermore, as also mentioned in the background of the invention, especially in segment liquid crystal displays with a large number of backplane electrodes, enhancement of the contrast between visible and invisible segments requires a large number of discrete voltage levels. The present solution allows generating as many discrete voltage levels as required by the application with greater flexibility compared to standard solutions. In fact the number of discrete voltage levels generated by the present solution depends only on the number of different duty cycle values provided by the controller 30 and used to generate the pulse-width-modulated control signal 35. In the present solution, the number of the different duty cycles and the values of the different duty cycles can easily be programmed or pre-programmed in the controller 30 for the specific application without the need for additional expensive hardware components. On the contrary, additional expensive hardware components are needed in prior art solutions using the above mentioned application specific segment liquid crystal interface or external resistor ladders powered by the supply voltage of a controller such as in the prior art solution described in the Freescale application note mentioned in the background of the invention.

Figure 2:
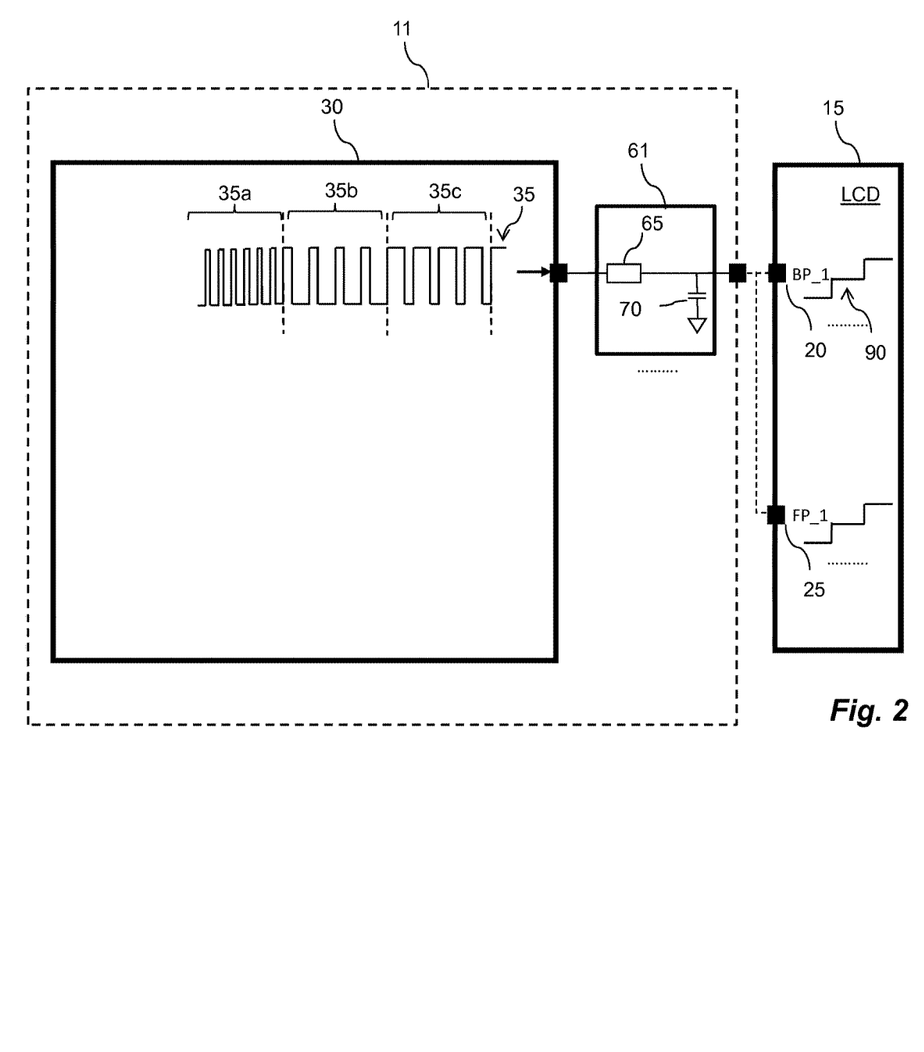

FIG. 2 shows another example of an embodiment of a control unit 11 used to control the segment liquid crystal display 15. The control unit 11 shown in FIG. 2 is similar to the control unit 10 shown in FIG. 1 with the difference that the integrator 61 is implemented as a series arrangement of a resistor 65 and a capacitor 70. In this embodiment the controller 30 is arranged to supply the pulse-width-modulated control signal 35 across the series arrangement to obtain the integrated control signal 90 across the capacitor 70. The embodiment shown in FIG. 2 uses a passive type of integrator that without a need of a supply voltage generates the integrated control signal 90. The resistor 65 and the capacitor 70 may for example be discrete surface mounted devices (SMD) soldered on a PCB board. The surface mounted devices may be chosen with a small package, for example 0402 package (or 0.4 mm by 0.2 mm) or even smaller packages (e.g. 0201) in which case size and costs of implementation of the integrator 61 and of the control unit 11 may be further reduced. A time constant of the series arrangement of the resistor 65 and of the capacitor 70 may be chosen to be greater than a repetition period of the pulse-width-modulated control signal 35. In this way ripple in the generated discrete voltage level of the integrated control signal 90 can be limited because the capacitor 70 does not have sufficient time to completely charge to the supply voltage or to completely discharge to the reference voltage of the controller 30 between two adjacent periods of the pulse-width-modulated control signal 35. Furthermore said time constant may be chosen to be smaller than a smallest time period of the pulse-width-modulated control signal 35 during which the variable duty cycle may be kept constant to generate a correspondent discrete voltage level. The latter choice may enable faster transitions between different discrete voltage levels of the integrated control signal 90. In other words, the values of the components of the series arrangement of the resistor 65 and of the capacitor 70 may be accurately elected to satisfy the requirements of having a small size by using a small package in order to reduce an overall chip area of the control unit 11 and of having at the same time a limited ripple and fast transitions between different discrete voltage levels of the integrated control signal 90.

In a further example of an embodiment according to the invention, the controller 30 may be configured to generate the variable duty cycle of the pulse-width-modulated control signal 35 by providing a constant duty cycle value within a predetermined time window of the pulse-width-modulated control signal 35. The pulse-width-modulated control signal 35 may contain at least three predetermined time windows 35a, 35b and 35c of equal duration, each one with a different constant duty cycle value, in order to generate after integration of the integrator 61 at least three different discrete voltage levels. The predetermined time window 35a, 35b or 35c depends on an operating frequency of the segment liquid crystal display 15 and on a number of backplanes electrodes used in the segment liquid crystal display 15. In fact, as said, the segment liquid crystal display 15 may have at least one backplane electrodes 20 or a plurality of backplane electrodes (not shown in FIGS. 1 and 2) depending on a number and complexity of segments to be displayed in the segment liquid crystal display 15. The operating frequency depends upon the type of the segment liquid crystal display 15 used and by the application in which the segment liquid crystal display 15 is used.

To explain further and by way of example we assume that the controller 30 of FIG. 1 or FIG. 2 has an internal clock frequency of 64 MHz which may be used as reference clock for the generation of the pulse-width-modulated control signal 35 and that the pulse-width-modulated control signal has a frequency 99 times smaller than the internal clock frequency, i.e. 646 KHz correspondent to a period of 1.55 us. The operating frequency of the segment liquid crystal display 15 in use may be in this example 64 Hz. If the segment liquid crystal display has four backplane electrodes and at least one front plane electrode 25, or a plurality of front plane electrodes, the control unit 10 or 11 will select one particular backplane electrode and drive an appropriate voltage level to the at least one front plane electrode 25 or to the plurality of front plane electrodes while the three backplane electrodes other than the particular one may be driven to an "non-active" state at which the root mean square of the differential voltages between the three backplane electrodes and the front plane electrode are below the required threshold to turn-on the visibility of the segment associated with the three backplane electrodes. This process is repeated for all four backplane electrodes of the segment liquid crystal display 15 to obtain together with the respective front plane electrodes the zero average voltage across the LCD material. Therefore, a refresh cycle of the segment liquid crystal display 15 of this example will have four phases, one for each of the four backplane electrodes. Visibility of a segment is turned on when the backplane electrode associated with said visible segment is driven to an "active" state, i.e. when the root mean square of the differential voltage between the backplane electrode and the front plane electrode associated with the visible segment is above the required threshold to turn-on the visibility of the segment. The backplane electrode associated with the visible segment is driven in the "active" state only in one so-called "selected" phase of the refresh cycle, and in the "non-active" state in the remaining three so-called "non-selected" phases of the same refresh cycle. Since the segment liquid crystal display 15 needs to be driven with a pure AC voltage without DC component, every other refresh cycle the voltage applied across the LCD material is inverted. In this example, thus, there will be two refresh cycles, each one with four phases. Since the segment liquid crystal display 15 has an operating frequency of 64 Hz, i.e. a period of 15.625 ms, the duration of each phase will be the period of the segment liquid crystal display 15 divided by eight, i.e. 1.953 ms which is, in this example, the duration of the predetermined time window above mentioned wherein the duty cycle value is constant. If in this example the integrator 61 shown in FIG. 2 is used, the time constant of the series arrangement of the resistor 65 and the capacitor 70 may be selected to be greater than the pulse-width-modulated control signal 15 period to limit the ripple, i.e. greater than 1.55 us, and smaller than the predetermined time window to enable fast transition between different discrete voltage levels, i.e. smaller than 1.953 ms. In this example a good value for the time constant of the series arrangement of the resistor 65 and the capacitor 70 may be 47 us which may be obtained with a resistor value of 4.7 kOhm and with a capacitor value of 10 nF.

Figure 3:
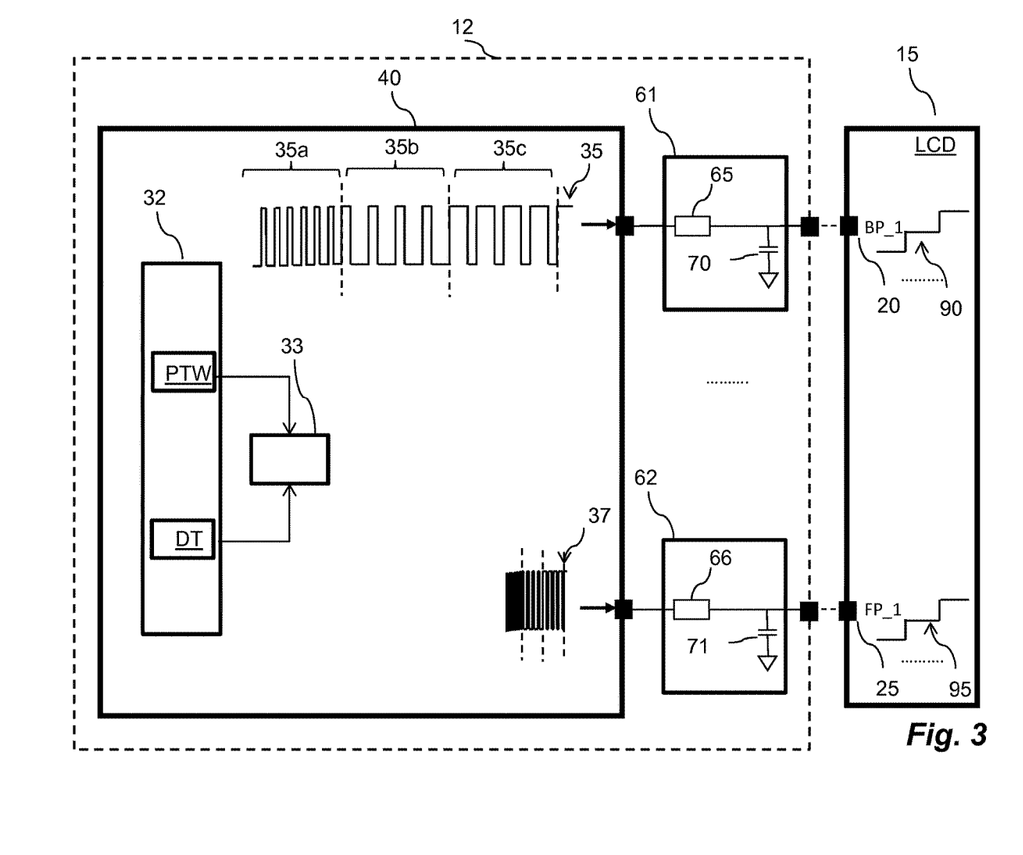

FIG. 3 shows another embodiment of a control unit 12 used to control the segment liquid crystal display 15. FIG. 3 is similar to FIG. 2 with the following differences. The first difference is that the controller 40 includes a memory 32 and a direct memory access module 33. The second difference is that a further integrator 62 implemented as a series arrangement of a resistor 66 and a capacitor 71 receives a further pulse-width-modulated control signal 37 generated in the controller 40 to provide a further integrated control signal 95 to the front plane electrode 25 of the segment liquid crystal display 16.

As noted for FIG. 1 and FIG. 2, the control unit 12 may include more integrators of the same type of the integrator 61 or the further integrator 62 to integrate further pulse-width-modulated control signals in order to obtain further integrated control signals supplying and controlling a plurality of backplane electrodes and/or front plane electrodes of the segment liquid crystal display 15. The controller 40 is further configured to generate the pulse-width-modulated control signal 35 from a duration and/or a start instant of the predetermined time windows 35a, 35b and 35c and from respective constant duty cycle values of each of the predetermined time windows 35a, 35b and 35c. Similarly, the controller 40 generates the further pulse-width-modulated control signal 37 by using a duration and/or a start instant of the corresponding predetermined time windows (not shown in FIG. 3) and associated constant duty cycle values. It should be noted that the further pulse-width-modulated control signal 37 shown in FIG. 3 is not in scale with the drawn pulse-width-modulated control signal 35 but it is a zoom-in version of the pulse-width-modulated control signal 35. In order to generate the pulse-width-modulated control signal 35, the controller 40 of FIG. 3 makes use of the memory 32 to store the duration and/or the start instant of the predetermined time windows 35a, 35b and 35c having each a respective constant duty cycle value, wherein said duration and/or start instant of the predetermined time windows 35a, 35b and 35c and associated constant duty cycle values may be determined by the specific application in which the control unit 12 is used to make visible a segment in the segment crystal liquid display 15. The area of the memory 32 in which the duration and/or the start instant of the predetermined time windows 35a, 35b and 35c are stored is schematically indicated with a predetermined time window box PTW and the area of the memory 32 wherein the associated constant duty cycles values are stored is schematically indicated with a duty cycle box DT. In case the segment liquid crystal display 15 has more backplane and front plane electrodes, the memory 32 stores also the duration and/or start instant of the corresponding predetermined time windows and the constant duty cycle values of each of the corresponding predetermined time windows associated with these other backplane and/or front plane electrodes. The direct memory access module 33 can copy and store the duration and/or the start instant of the predetermined time windows 35a, 35b and 35c and the associated constant duty cycle values directly from the memory 32, as schematically shown in FIG. 3 by the two connecting arrows, thereby avoiding an intervention of a control processing unit (i.e. the CPU) each time a pulse-width-modulated control signal needs to be generated to update the visibility of the segments in the segment liquid crystal display 15. In other words the CPU of the controller 40 of control unit 12 is not overloaded each time the segment liquid crystal display 15 is updated.

Figure 4:
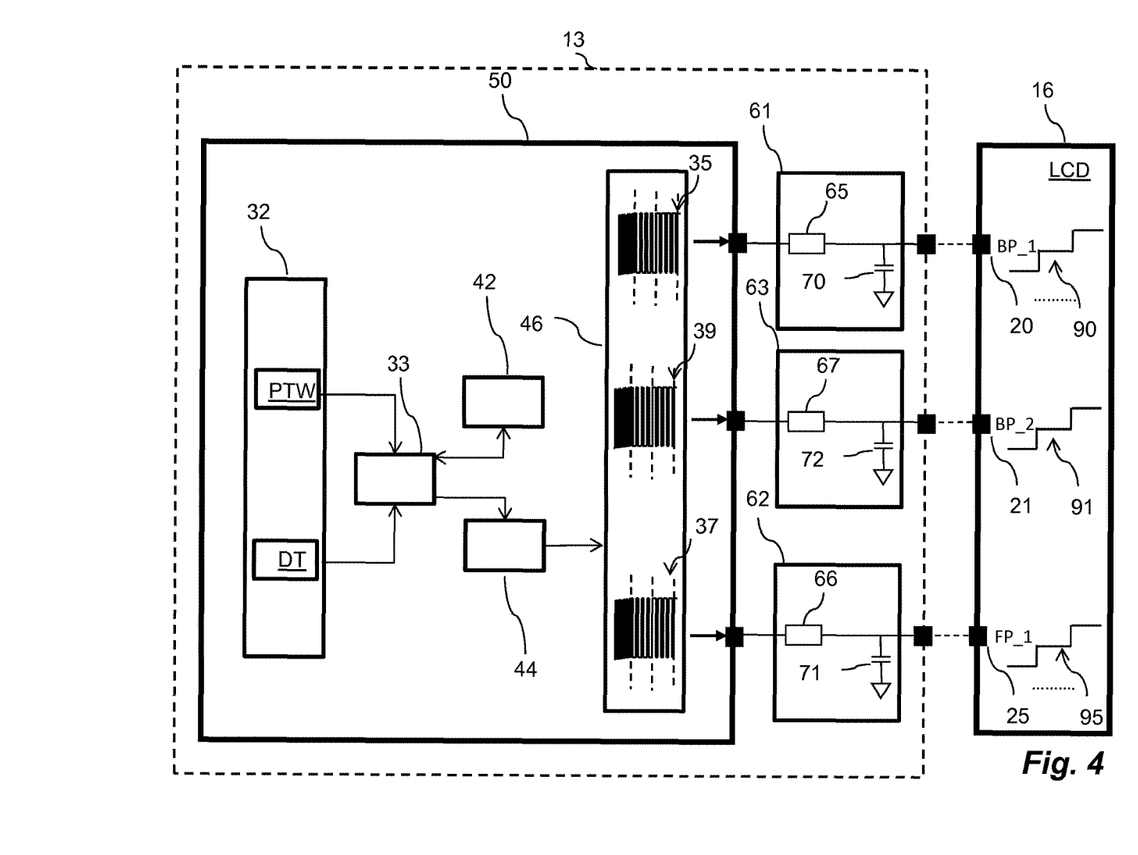

FIG. 4 shows another embodiment of a control unit 13 used to control the segment liquid crystal display 16. The control unit 13 supplies via three correspondent outputs of the control unit 13, three pulse-width-modulated control signals 35, 39 and 37 to the respective at least one backplane electrode 20, to a further backplane electrode 21 and to the at least one front plane electrode 25. The controller 50 shown in FIG. 4 further includes, compared to the controller 40 shown in FIG. 3, a timer module 42 which is configured to read from the direct memory access module 33 the duration and/or the start instant of the predetermined time window 35a, 35b or 35c shown in FIG. 3 of any of the pulse-width-modulated control signals 35, 39 or 37 to be generated. The timer module 42 is further configured to periodically trigger the direct memory access module 33 at the end of each predetermined time window 35a, 35b or 35c to read the duration and/or the start instant of the successive predetermined time window 35a, 35b or 35c from the memory 32 and to store said duration and/or start instant of the successive predetermined time window in a corresponding register of the timer module 42. In this way a time partitioning of the pulse-width-modulated control signal 35 with reference to the different duty cycle values in each predetermined time window 35a, 35b and 35c is defined for the at least the backplane electrode 20 in each one of the refresh cycles. The time partitioning of the pulse-width-modulated control signals 37 and 39 are defined in a similar manner by the timer module 42. As said FIG. 4 differs from FIG. 3 in that the segment liquid crystal display 16 of FIG. 4 includes at least a further backplane electrode 21 and that a further corresponding pulse-width-modulated control signal 39 is generated by the controller 50 to obtain by integration of a corresponding further integrator 63 coupled to the further backplane electrode 21 via a corresponding output of the control unit 13, a corresponding further integrated control signal 91. The segment liquid crystal display 16 shown in FIG. 4 may be a dynamically driven segment liquid crystal display with at least two backplane electrodes 20 and 21 wherein each of the at least the backplane electrode 20 or the further backplane electrode 21 may be associated with more than one segment of the liquid crystal display 16. As for FIGS. 1 to 3, the segment liquid crystal display 16 of FIG. 4 may include more than two backplane electrodes and/or a plurality of front plane electrodes according to the application in which the segment liquid crystal display 16 may need to be used.

The controller 50 further includes a pulse-width modulation module 44 which is configured to read the constant duty cycle value from the direct access memory module 33 when the direct access module 33 is triggered by the timer module 42 to copy and obtain said constant duty cycle values from the memory 32. Once the constant duty cycle values are read, the pulse-width modulation module 44 writes said constant duty cycle values into corresponding registers associated to the backplane electrode 20, the further backplane electrode and the front plane electrode 25. The pulse-width-modulated control signals 35, 37 and 39 in this way generated are received by an input/output control module 46 which is coupled to the pulse-width modulation module 44 to provide the pulse-width-modulated control signals 35, 37 and 39 to the corresponding integrators 61, 62 and 63. The corresponding integrators 61, 62 and 63 may be, as shown in FIG. 4, a series arrangement of a resistor 65 and a capacitor 70 for the integrator 61, a series arrangement of another resistor 66 and another capacitor 77 for another integrator 62 coupled to the at least front plane electrode 25, and a series arrangement of a further resistor 67 and a further capacitor 72 for the further corresponding integrator 63 coupled to the further backplane electrode 21.

The input/output control module 46 may include level shifters or buffers to level shift the two voltage levels of the internally generated pulse-width-modulated control signals 35, 37 and 39 to the desired two voltage levels of the controller 50, e.g. the supply voltage and the reference voltage of the controller 50. In fact, generation and processing of the pulse-width-modulated control signals 35, 37 and 39 other than in the input/output control module 46 may occur at a lower internal supply voltage than an external supply voltage of the controller 50, while the input/output control module 46 may provide this desired up-shift from the a lower internal supply voltage to the higher external supply voltage of the controller 50.

The segment liquid crystal display 15 or 16 and the control unit 10, 11, 12 or 13 so far described through the FIGS. 1 to 4 may be part of a segment liquid crystal display devices. Such device may be for example a ventilation unit or an air conditioning unit of an automotive vehicle, or a cluster instrument unit to show application specific symbols on the segments liquid crystal display 15 or 16.

Figure 5:
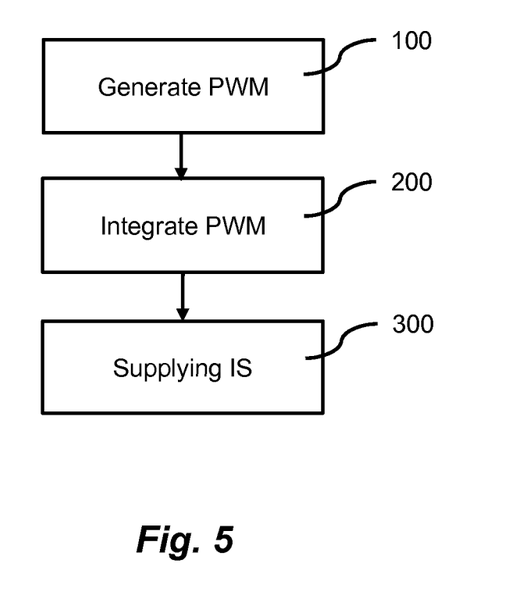

FIG. 5 schematically shows a flow chart of a method of controlling the segment liquid crystal display 15 or 16 described through the FIGS. 1 to 4. As indicated in FIG. 5 said method may include the following steps: i) generating 100 a pulse-width-modulated control signal 35 with two voltage levels and a variable duty cycle, ii) integrating 200 the pulse-width-modulated control signal 35 to obtain an integrated control signal 90 which has more than two voltage levels that correspond to different duty cycle levels present in the pulse-width-modulated control signal 35, and iii) controlling 300 the visibility of a same segment in the segment liquid crystal display 15 with the integrated control signal 90 which is coupled to the at least a backplane electrode 20 or to the at least a front plane electrode 25 of the segment liquid crystal display 15 or 16 as described through the FIGS. 1 to 4.

With reference to the controller 50 described in FIG. 4, the method described in FIG. 5 may include before the step of generating 100 the pulse-width-modulated control signal 35, the additional steps of:

(a) storing a duration and/or a start instant of a predetermined time window and a corresponding constant duty cycle value in a memory 32, (b) triggering a direct access module 33 which is coupled to the memory 32 in order to obtain the duration and/or the start instant of the predetermined time window and the correspondent constant duty cycle value from the memory 32, (c) reading the duration and/or the start instant of the predetermined time window from the memory 32, (d) copying the duration and/or the start instant of the predetermined time window to a register associated to a timer module 42 coupled to the direct memory access module 33, and (e) copying the constant duty cycle value for the at least a backplane electrode to a pulse-width-modulation generation unit 44 which is coupled to the direct memory access module 33.

This process may be executed first to control the at least a backplane electrode 20 and successively to control the at least a front plane electrode 25. Alternatively any one of the backplane electrode 20 or the front plane electrode 25 which is not controlled by the method so far described, may be controlled with an external control voltage derived directly from the supply voltage of the controller in use as described in the background of invention.

A control unit 10, 11, 12 or 13 as shown in the FIGS. 1 to 4 and described here above may be used to perform the method of controlling the segment liquid crystal display 15 or 16. Visibility or invisibility of segments in the segment liquid crystal display 15 or 16 depends on a specific application wherein the segment liquid crystal display 15 or 16 may be used. Therefore the specific application may determine which predetermined time window duration and/or start instant and which correspondent constant duty cycle value may be stored in the memory 32, while the control unit 10, 11, 12 or 13 may read and process said predetermined time window duration and/or start instant and correspondent constant duty cycle value to generate the desired pulsed-width modulated control signal 35. The solution provided ensures that the specific application is not interrupted by the generation of the pulsed-width modulated control signal 35. The specific application needs only to update the predetermined time window duration and/or start instant and correspondent constant duty cycle value in the memory 32 according to the requirements of the specific application.

In one embodiment a computer program product (e.g. a software product) may include instructions that are run in a computer system to perform the steps of the method above described.

The computer system may be a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices. For example the controller 30 be integrated in a single chip with the integrator 60 or the controller 40 may be integrated in a single chip with the integrators 61 and 62. Alternatively the integrators 61 and 62 of FIG. 3 may be implemented with discrete component and only the controller 40 may be integrated in a single semiconductor chip.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A unit for controlling a segment liquid crystal display, comprising at least a backplane electrode and at least a front plane electrode both being associated with a same segment of the segment liquid crystal display, the unit comprises:
   a controller for generating a pulse-width-modulated control signal having two voltage levels and a variable duty cycle,
   an integrator for integrating the pulse-width-modulated control signal to generate an integrated control signal having more than two voltage levels corresponding to different ones of the variable duty cycle,
   an output for supplying the integrated control signal to the at least a backplane electrode or to the at least a front plane electrode to control a visibility of the same segment in the segment liquid crystal display.

2. A unit as claimed in claim 1, wherein the integrator is a series arrangement of a resistor and a capacitor, and the controller is arranged for supplying the pulse-width-modulated control signal across the series arrangement to obtain the integrated control signal across the capacitor.

3. A unit as claimed in claim 1, wherein the controller is configured for generating the variable duty cycle of the pulse-width-modulated control signal by generating different duty cycles during at least three predetermined time windows to obtain more than two voltage levels, wherein the variable duty cycle has a constant duty cycle value within each one of the three predetermined time windows.

4. A unit as claimed in claim 3, wherein the controller comprises a memory for storing a duration and/or a start instant of the three predetermined windows, and the constant duty cycle values of the corresponding three predetermined time windows by an application for making visible the corresponding segments on the segment liquid crystal display, and wherein the controller comprises a direct memory access module configured for directly accessing the memory for reading the duration and/or the start instant of the three predetermined time windows and the corresponding constant duty cycle values of the at least three of the predetermined time windows of the pulse-width-modulated control signal.

5. A unit as claimed in claim 4, wherein the controller further comprises a timer module configured for reading the duration and/or the start instant of the predetermined time window from the direct memory access module and for periodically triggering the direct memory access module at the end of the predetermined time windows to read another duration and/or another start instant of another successive one of the predetermined time windows from the memory and storing the read another duration and/or another start instant of the another successive one of the predetermined time windows in a corresponding register of the timer module for defining a time partitioning of the pulse-width-modulated control signal.

6. A unit as claimed in claim 4, wherein the controller further comprises a pulse width modulation module configured for: reading the constant duty cycle value from the direct memory access module when triggered by the timer module, and writing the constant duty cycle value into corresponding registers associated to the at least a backplane electrode or to the at least a front plane electrode, for generating the corresponding pulse width modulated control signal.

7. A unit as claimed in claim 6, wherein the controller further comprises an input/output control module coupled to the pulse width modulation module for providing the corresponding pulse-width-modulated control signal to the integrator at an output of the controller; wherein the integrator is a series arrangement of a resistor and a capacitor, and the controller is arranged for supplying the pulse-width-modulated control signal across the series arrangement to obtain the integrated control signal across the capacitor.

8. A unit as claimed in claim 2 wherein a time constant of the series arrangement of the resistor and of the capacitor is chosen to be smaller than the predetermined time window and greater than the repetition period of pulse-width-modulated control signal.

9. A unit as claimed in claim 1 further comprising a further output and a further integrator, wherein the controller is configured for generating a further pulse-width-modulated control signal and wherein the further integrator is configured for generating a further integrated control signal being supplied via the further output to any one the at least a backplane electrode or to the at least a front plane electrode not coupled to the first mentioned integrator.

10. A unit as claimed in claim 1 wherein the segment liquid crystal display is a dynamically controlled segment liquid crystal display comprising at least a further backplane electrode and wherein the controller is further configured for generating a further corresponding pulse-width-modulated control signal integrated by a further corresponding integrator to obtain a correspondent further integrated control signal coupled to the further backplane electrode via a further corresponding output of the unit for controlling the visibility of a further segment associated with the further backplane electrode.

11. A unit as claimed in claim 1 wherein the controller is a general purpose microcontroller.

12. A segment liquid crystal display device comprising the unit according to claim 1, and the segment liquid crystal display.

13. A segment liquid crystal display device according to claim 12 wherein the segment liquid crystal display is a twisted nematic liquid crystal display.

14. A heating ventilation unit or air conditioning unit for an automotive vehicle comprising the segment liquid crystal display device according to claim 12.

15. An integrated circuit comprising the controller of the unit as claimed in-claim 1.

16. A unit as claimed in claim 2, wherein the controller is configured for generating the variable duty cycle of the pulse-width-modulated control signal by generating different duty cycles during at least three predetermined time windows to obtain more than two voltage levels, wherein the variable duty cycle has a constant duty cycle value within each one of the three predetermined time windows.

17. A unit as claimed in claim 3 wherein a time constant of the series arrangement of the resistor and of the capacitor is chosen to be smaller than the predetermined time window and greater than the repetition period of pulse-width-modulated control signal.

18. A unit as claimed in claim 2 wherein the segment liquid crystal display is a dynamically controlled segment liquid crystal display comprising at least a further backplane electrode and wherein the controller is further configured for generating a further corresponding pulse-width-modulated control signal integrated by a further corresponding integrator to obtain a correspondent further integrated control signal coupled to the further backplane electrode via a further corresponding output of the unit for controlling the visibility of a further segment associated with the further backplane electrode.

19. A method of controlling a segment liquid crystal display, the segment liquid crystal display including at least a backplane electrode and at least a front plane electrode both being associated with a same segment of the segment liquid crystal display, the method comprising:
generating a pulse-width-modulated control signal having two voltage levels and a variable duty cycle,
integrating the pulse-width-modulated control signal to obtain an integrated control signal having more than two voltage levels corresponding to different ones of the variable duty cycle,
supplying the integrated control signal to the at least a backplane electrode or to the at least a front plane electrode to control a visibility of the same segment in the segment liquid crystal display.

* * * * *